United States Patent
Mukai et al.

(10) Patent No.: US 9,475,700 B2
(45) Date of Patent: Oct. 25, 2016

(54) METHOD FOR MANUFACTURING CARBON FIBER, AND CARBON FIBER

(71) Applicants: ASAHI CARBON CO., LTD., Niigata-shi, Niigata (JP); NATIONAL UNIVERSITY CORPORATION HOKKAIDO UNIVERSITY, Sapporo-shi, Hokkaido (JP)

(72) Inventors: Shin Mukai, Sapporo (JP); Yusuke Rikima, Sapporo (JP); Riku Furukawa, Sapporo (JP); Isao Ogino, Sapporo (JP); Togo Yamaguchi, Niigata (JP)

(73) Assignees: ASAHI CARBON CO., LTD., Niigata-Shi, Niigata (JP); NATIONAL UNIVERSITY CORPORATION HOKKAIDO UNIVERSITY, Sapporo-Shi, Hokkaido (JP)

( * ) Notice: Subject to any disclaimer, the term of this patent is extended or adjusted under 35 U.S.C. 154(b) by 0 days.

(21) Appl. No.: 14/382,427

(22) PCT Filed: Mar. 7, 2013

(86) PCT No.: PCT/JP2013/001473
§ 371 (c)(1),
(2) Date: Sep. 2, 2014

(87) PCT Pub. No.: WO2013/132871
PCT Pub. Date: Sep. 12, 2013

(65) Prior Publication Data
US 2015/0086469 A1 Mar. 26, 2015

(30) Foreign Application Priority Data
Mar. 8, 2012 (JP) ................. 2012-051855

(51) Int. Cl.
*C01B 31/02* (2006.01)
*D01F 9/127* (2006.01)
*B82Y 30/00* (2011.01)

(52) U.S. Cl.
CPC ............ *C01B 31/0246* (2013.01); *B82Y 30/00* (2013.01); *C01B 31/022* (2013.01); *D01F 9/127* (2013.01); *D01F 9/1276* (2013.01); *D01F 9/1277* (2013.01)

(58) Field of Classification Search
CPC ............ C01B 31/022; C01B 31/0226; C01B 31/0246
See application file for complete search history.

(56) References Cited

U.S. PATENT DOCUMENTS 7,550,130 B2 * 6/2009 Wang et al. ............... 423/447.3
2005/0287064 A1 * 12/2005 Mayne .................. B82Y 30/00
423/445 B

FOREIGN PATENT DOCUMENTS

CN 1678523 10/2005
JP 62062914 A 3/1987
(Continued)

OTHER PUBLICATIONS

Machine English translation of JPH06-146117.*
(Continued)

*Primary Examiner* — Richard M Rump
(74) *Attorney, Agent, or Firm* — Nath, Goldberg & Meyer; Jerald L. Meyer; Stanley N. Protigal

(57) ABSTRACT

In the present invention, a starting material liquid including a carbon compound and a catalyst or a catalyst precursor, and a reaction vessel having a high-temperature zone heated to 900-1,300° C. are prepared. The starting material liquid is introduced into the reaction vessel, and a mixture is generated which comprises a gas including a carbon source, and catalyst microparticles dispersed in the gas. A carrier gas is then introduced in pulses into the reaction vessel, and the mixture is pushed out to the high-temperature zone. The carbon source and catalyst microparticles included in the mixture are then brought into contact with each other in the high-temperature zone, initial fibers are grown, and carbon fibers are subsequently grown in an environment in which the carrier gas is retained.

5 Claims, 4 Drawing Sheets

(56) References Cited

FOREIGN PATENT DOCUMENTS

| | | |
|---|---|---|
| JP | 06146116 A | 5/1994 |
| JP | 06146117 A | 5/1994 |
| JP | 2003171832 A | 6/2003 |
| JP | 2004360108 A | 12/2004 |
| JP | 2010052958 A | 3/2010 |
| WO | 2006030963 A1 | 3/2006 |

OTHER PUBLICATIONS

Li, Xuesong, et al. "Bottom-up growth of carbon nanotube multilayers: unprecedented growth." Nano letters 5.10 (2005): 1997-2000.*

* cited by examiner

METHOD FOR MANUFACTURING CARBON FIBER, AND CARBON FIBER

TECHNICAL FIELD

The present invention relates to a manufacturing method of carbon fiber, and carbon fiber obtained by the method.

BACKGROUND ART

Carbon fiber exhibits superior mechanical strength, electric conductivity, heat conductivity and other properties compared to glass fiber and has therefore been used in many applications including plastic reinforced materials, gas storage materials, and electrode materials.

Methods of manufacturing carbon fiber that are well-known in the art include carbonization of organic fiber such as synthetic fiber or petroleum pitch fiber, and thermal decomposition of a hydrocarbon such as benzene or methane under the presence of catalyst to produce carbon fiber (gas phase method). The gas phase method is the most suitable method for continuous mass production.

Manufacturing of carbon fiber by the gas phase method is usually effected by either one of the following methods: 1) A first manufacturing method wherein in a high-temperature reactor a gaseous hydrocarbon introduced into the reactor is allowed to contact a catalyst fixed on a substrate; and 2) a second manufacturing method wherein a raw material including a hydrocarbon and a catalytic component is introduced into a high-temperature zone of a reactor in the form of gas or liquid. The first manufacturing method does not lend itself for continuous production because it requires the step of taking out produced carbon fibers by removing the catalyst fixed-substrate. On the other hand, the second manufacturing method lends itself for continuous production because it does not require such complexity. Especially, among different types of the second manufacturing method, a manufacturing method that involves pulse introduction of a raw material liquid (Liquid Pulse Injection technique; LPI technique) can produce highly dense catalyst fine particles which are advantageous for the production of carbon fiber.

As examples of the second manufacturing method (LPI technique), PTLs 1 to 3 disclose a rapid and efficient manufacturing method of carbon fiber by pulse introduction of a raw material liquid containing a hydrocarbon and a catalytic component into a reactor in which a carrier gas flows continuously. PTL 4 discloses a continuous manufacturing method of carbon fiber by introducing a raw material liquid containing 15 mol % or more of methane into a high-temperature zone having a temperature of 1,100° C. to 1,500° C. for efficient use of catalyst.

CITATION LIST

Patent Literature

PTL 1
Japanese Patent Application Laid-Open No. 6-146116
PTL 2
Japanese Patent Application Laid-Open No. 6-146117
PTL 3
Japanese Patent Application Laid-Open No. 2004-360108
PTL 4
WO2006/030963

SUMMARY OF INVENTION

Technical Problem

Growth of carbon fiber by the second manufacturing method (LPI technique) proceeds in two stages: "longitudinal direction growth" wherein primary fibers grow in a longitudinal direction by catalysis; and "radial direction growth" wherein the primary fibers grow in a radial direction by thermal CVD. Each process proceeds in a high-temperature zone of the reactor. Therefore, primary fibers can be produced efficiently by rapidly delivering a raw material gas containing a carbon source and catalyst fine particles (mixture produced by evaporation or thermal decomposition of the raw material liquid) into the high-temperature zone. Subsequently, the primary fibers are grown in the radial direction by retaining the primary fibers in the high-temperature zone for a certain period of time.

In the conventional carbon fiber manufacturing methods disclosed in PTLs 1 to 4, a carrier gas is flowed at a constant linear velocity. Therefore, for efficient production of primary fibers with these manufacturing methods, the linear velocity of the carrier gas is increased for rapid delivery of raw material gas into the high-temperature zone. However, when the linear velocity of the carrier gas is increased, the retention time of primary fibers in the high-temperature zone shortens and therefore the primary fibers cannot be grown sufficiently in the radial direction. Consequently, the yield of carbon fiber becomes low. On the other hand, when the linear velocity of the carrier gas is reduced, a period from the point when the raw material liquid is introduced to the point when primary fibers start to grow lengthens, and therefore the productivity of carbon fiber becomes low. Reduced linear velocity also widens the window of time at which catalyst fine particles reach the high-temperature zone, resulting in variation in the onset of growth of primary fibers. Therefore, the diameters of carbon fibers vary widely.

An object of the present invention is to provide a manufacturing method of carbon fiber that enables efficient manufacture of carbon fiber having a small diameter variation. Another object of the present invention is to provide carbon fiber produced by the manufacturing method.

Solution to Problem

The inventors established that above-mentioned problems can be solved by pulse introduction of a carrier gas, and with further studies, completed the present invention.

The present invention relates to the following manufacturing methods of carbon fiber.

[1] A method of manufacturing carbon fiber including:
preparing a raw material liquid containing a carbon compound and a catalyst or catalyst precursor;
providing a reactor having a high-temperature zone heated to a temperature at which carbon fiber can be grown;
producing a mixture consisting of a gas containing a carbon source and of catalyst fine particles dispersed in the gas, by introducing the raw material liquid into the reactor; and
pushing out the mixture to the high-temperature zone by introducing a carrier gas pulsedly into the reactor.

[2] The manufacturing method of carbon fiber according to [1] further including:
after pushing out the mixture to the high-temperature zone by introducing the carrier gas pulsedly into the reactor, growing in the high-temperature zone primary fibers by contacting the carbon source with the catalyst fine particles contained in the mixture, and subsequently growing carbon fibers under an environment where the carrier gas is retained.

[3] The manufacturing method of carbon fiber according to [1] or [2], wherein the mixture and the carrier gas are introduced into a region of the reactor other than the high-temperature zone.

[4] The manufacturing method of carbon fiber according to any one of [1] to [3], wherein the mixture is produced by evaporation or thermal decomposition of the raw material liquid introduced into the reactor.

[5] The manufacturing method of carbon fiber according to any one of [1] to [4], wherein a temperature of the high-temperature zone is in a range of 900 to 1,300° C.

The present invention also relates to the following carbon fiber.

[6] A carbon fiber having a diameter in a range of 1 to 1,000 nm, and a relative standard deviation of the fiber diameter of 20% or less.

Advantageous Effects of Invention

According to the manufacturing method of the present invention, carbon fiber having a small diameter variation can be produced with a high yield. The manufacturing method of the present invention also allows for the introduction of a raw material liquid at shorter intervals than are used in the conventional LPI technique, as well as cut-down of carrier gas usage compared to the conventional LPI technique. Therefore, according to the manufacturing method of the present invention, the productivity of carbon fiber can be significantly improved.

DESCRIPTION OF EMBODIMENTS

Figure 1:
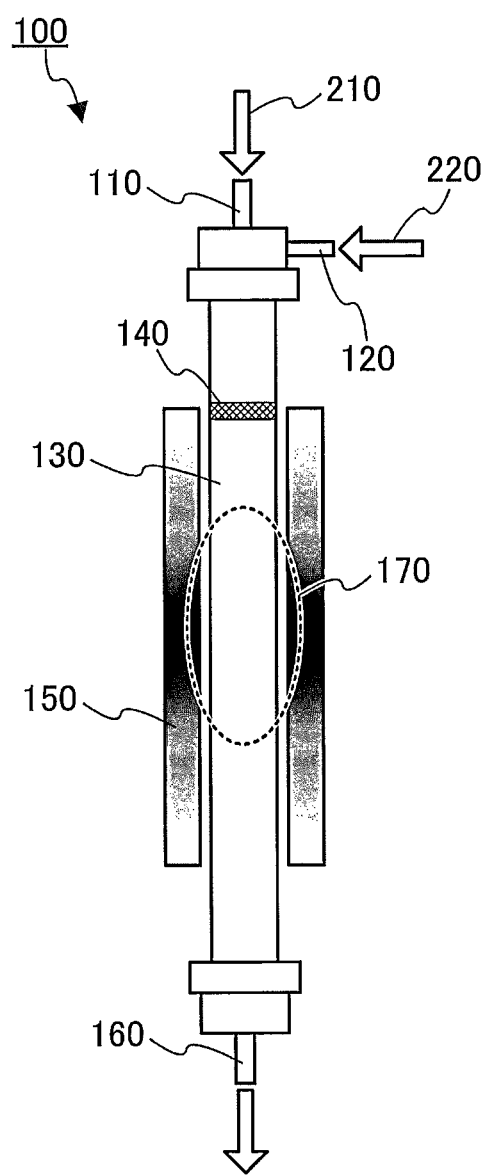
FIG. 1 is a schematic view illustrating a configuration of a carbon fiber manufacturing apparatus according to an embodiment of the present invention.

A manufacturing method of carbon fiber according to the present invention includes the steps of: 1) preparing a raw material liquid; 2) providing a heated reactor; 3) introducing the raw material liquid into the reactor; 4) introducing a carrier gas pulsedly into the reactor; and 5) producing carbon fiber. As will be described later, the fifth step will be performed spontaneously with the fourth step. Typically, the third step, fourth step and fifth step are steps performed in sequence, and the sequence is repeated. Hereinafter, each step will be described.

1) First Step

In the first step, a raw material liquid containing a carbon compound and a catalyst or catalyst precursor is prepared. For example, the raw material liquid can be prepared by dispersing or dissolving a catalyst or catalyst precursor in a liquid composed of a carbon compound.

The carbon compound is a carbon source from which carbon fiber is produced. Any carbon compound can be used and hydrocarbons are typically used. Examples of carbon compounds contained in the raw material liquid include liquid aliphatic hydrocarbons such as hexane, heptane, octane, pentene, and hexene; aromatic hydrocarbons such as benzene, toluene, naphthalene, and anthracene; alcohols such as methanol and ethanol; ketones; and ethers. These carbon compounds can be used singly or in combination. According to the carbon fiber manufacturing method of the present invention, the diameter of the produced carbon fiber can be controlled by the choice of the type of the carbon compound used. When an alcohol such as methanol or ethanol is used, fine carbon fiber with a diameter of 1 to 50 nm can be produced. Other examples of the carbon source include compositions rich in carbon compounds, such as cracked petroleum obtained by thermal decomposition of waste rubber such as waste tires; refined oils originated from animals or plants and waste oils thereof; and residue oils generated in oil refineries.

As will be described later, according to the carbon fiber manufacturing method of the present invention, carbon fiber is produced by contacting a carbon source with catalyst fine particles (fine particles of metallic catalyst) in a high-temperature zone. Examples of metals which can be used as the catalyst include iron, nickel, cobalt, titanium, zirconium, vanadium, niobium, manganese, rhodium, tungsten, palladium, plutonium, and silicon. Catalyst fine particles made of any of these metals are added to the raw material liquid either as fine metal particles that serve as catalyst fine particles or as an organometallic compound, a catalyst precursor. Examples of the organometallic compound used as the catalyst precursor include ferrocene and iron acetylacetonate. A catalytic promoter may be added to the raw material liquid. Examples of the catalytic promoter include thiophene and benzothiophene.

By adjusting the concentration of a catalyst or catalyst precursor in the raw material liquid, the growth rate, size (length and diameter), surface morphology and the like of carbon fiber can be controlled. For example, when the catalyst concentration is increased, the number of catalyst fine particles in the raw material gas produced in the third step increases so that the number of carbon fibers increases. Consequently, the amount of carbon available per carbon fiber decreases, leading to a small carbon fiber diameter. On the other hand, when the catalyst concentration is reduced, the number of catalyst fine particles produced decreases, leading to a large carbon fiber diameter. Usually, the concentration of a catalyst or catalyst precursor in the raw material liquid is 0.01 to 15% by mass, and preferably 0.05 to 10% by mass.

2) Second Step

In the second step, a heated reactor for producing carbon fiber is provided. The second step can be performed either before or after the first step.

The reactor can be of any shape as long as the third step, fourth step and fifth step can be performed. The reactor shape is for example a circular tube or a square tube. One specific example of the reactor shape is a circular tube shape such as that illustrated in FIG. 1. The reactor can be of any size and the reactor size may be determined appropriately according to for example amounts of the raw material liquid and carrier gas to be introduced in the reactor. To the reactor, a raw material liquid introduction port, a carrier gas introduction port, and a gas discharge port are coupled. The carrier gas introduced pulsedly from the carrier gas introduction port into the reactor will be discharged from the gas discharge port after pushing out a mixture derived from the raw material liquid (later described) to a high-temperature zone (later described) of the reactor.

The reactor preferably has heat resistance and pressure resistance because the reactor is heated and a carrier gas (gas pulse) is introduced inside the reactor. Examples of reactor materials include ceramics, stainless steels, glass, and metals whose inside is coated with glass.

At least a part of the reactor is heated to a temperature at which carbon fibers can be produced. As used herein, a region which is heated for carbon fiber production (carbon fiber production region) is referred to as a "high-temperature zone". The temperature of the high-temperature zone is for example in a range of 900 to 1,300° C. Any method can be employed for heating the reactor. The reactor is heated for example by an electric furnace. The reactor is preferably filled, for example, with helium gas, argon gas, nitrogen gas, neon gas, krypton gas, hydrogen gas, carbon monoxide gas, chlorine gas or the like.

3) Third Step

In the third step, the raw material liquid prepared in the first step is introduced into the reactor provided in the second step. By evaporating the raw material liquid, a mixture composed of gas containing a carbon source and catalyst fine particles dispersed in the gas (hereinafter also referred to as "raw material gas") is produced.

Any method can be employed for introducing the raw material liquid; dropping of raw material liquid droplets into the reactor using a microsyringe or a pulse metering pump, or spraying the raw material liquid into the reactor by a sprayer may be employed. In the former method, as a droplet is brought into contact with the inner wall of the reactor, a porous body placed in the reactor or the like, the raw material liquid evaporates or undergoes thermal decomposition to produce a raw material gas containing a carbon source and catalyst fine particles. In the latter method, a fine spray of the raw material liquid evaporates or undergoes thermal decomposition in the reactor to produce a raw material gas containing a carbon source and catalyst fine particles.

From the perspective of allowing the carbon source and catalyst fine particles to exist in a densely packed state, it is preferable to introduce the raw material liquid pulsedly. The carbon source is produced by evaporation or thermal decomposition of a carbon compound contained in the raw material liquid. The type of the carbon compound serving as a carbon source changes with time. When the carbon compound contained in the raw material liquid is benzene, for example, the carbon source contained in the raw material gas is considered to change in order of decreasing molecular weight: benzene, propylene, ethylene, and methane, for example. The catalyst fine particles are either contained in the raw material liquid or produced by evaporation or thermal decomposition of an organometallic compound, a catalyst precursor. In the latter case, when the organometallic compound is thermally decomposed, atomic metals are generated, and the catalyst fine particles are formed by the atomic metals aggregated. Therefore, when the raw material liquid is introduced pulsedly, the carbon source and the catalyst fine particles would exist in a densely packed state in the raw material gas.

As will be described later, the raw material gas is pushed out to a high-temperature zone by a carrier gas in the fourth step. Therefore, typically, the raw material liquid, a source of the raw material gas, is introduced to a region other than the high-temperature zone of the reactor. The introduction amount of the raw material liquid is determined according to for example the volume of the reactor. When the volume of the reactor is about 1 to 5 L, for example, the introduction amount of the raw material liquid is about 20 to 200 µL. The introduction time of the raw material liquid is about 0.2 to about 4.0 seconds and preferably in a range of about 0.3 to about 0.6 seconds.

4) Fourth Step

The fourth step is performed after, preferably immediately after, the third step. In the fourth step, a carrier gas is introduced pulsedly into the reactor and thereby the raw material gas produced in the third step is pushed out to the high-temperature zone of the reactor.

The carrier gas has a function to push out the raw material gas positioned in regions other than the high-temperature zone of the reactor to the high-temperature zone. Therefore, typically, the carrier gas is introduced into a region other than the high-temperature zone of the reactor. The carrier gas is introduced for example into the region where the raw material liquid has been introduced in the third step.

Any method can be employed for introducing the carrier gas (gas pulse). Carrier gas introduction may be effected using for example a valve which opens and closes at a predetermined timing. The amount of the carrier gas per pulse is determined according to the volume of the reactor, the distance between the carrier gas introduction port to the high-temperature zone, and the like. When the volume of the reactor is about 1 to about 5 L, for example, the amount of the carrier gas per pulse is about 20 to about 100 mL The pulse width (introduction time per pulse) is about 0.005 to about 2.0 seconds and preferably in a range of about 0.01 to about 0.5 seconds.

The carrier gas is required to be inert at temperatures at which carbon fiber is grown (e.g., 900 to 1,300° C.), not to reduce the catalytic activity, and not to react with the carbon fiber. Any type of carrier gas can be employed as long as these requirements are satisfied. Examples of the carrier gas include helium gas, argon gas, nitrogen gas, neon gas, krypton gas, hydrogen gas, carbon monoxide gas, and chlorine gas. These gasses can be used singly or in combination.

5) Fifth Step

The fifth step is performed spontaneously in the high-temperature zone as a result of introduction of the gas pulse in the fourth step. In the fifth step, primary fibers are grown by allowing the carbon source and the catalyst fine particles contained in the raw material gas to contact each other in the high-temperature zone of the reactor followed by growth of carbon fibers. In the carbon fiber manufacturing method of the present invention, since the carrier gas is introduced pulsedly, the linear velocity of the carrier gas pushed out is large at the time when the primary fibers grow. On the other hand, at the time of the subsequent growth of the carbon fibers, the linear velocity of the carrier gas becomes low as the gas pressure decreases with time, so that the carrier gas is in the retained state.

When the carbon source and the catalyst fine particles contact each other under a high-temperature environment (e.g., 900 to 1,300° C.), primary fibers grow in a longitudinal direction by catalysis (longitudinal direction growth). Subsequently, the primary fibers grow in a radial direction by thermal CVD (radial direction growth). In the raw material gas retained in the high-temperature zone of the reactor, carbon fibers are produced as the two-stage process sequentially proceeds.

The retention time of the raw material gas in the high-temperature zone may be determined appropriately from the perspective of growing carbon fibers sufficiently in the longitudinal and radial directions, as well as from the perspective of production efficiency. When the volume of the reactor is about 1 to about 5 L, for example, the retention time of the raw material gas in the high-temperature zone is about 10 to about 20 seconds.

As described above, the third step, fourth step and subsequent fifth step are steps performed in sequence. By repeating the sequence of these steps, carbon fibers can be produced continuously. In this case, the introduction intervals of the raw material liquid are preferably in a range of 5 to 120 seconds and more preferably in a range of 30 to 90 seconds. As used herein, "introduction intervals" means intervals between starts of introduction. When the intervals become shorter, the carbon fiber yield and production efficiency improve, however, raw materials derived from the raw material liquids introduced at different timings interfere each other so that the purity of carbon fiber may undesirably decrease.

In the above described procedures, carbon fiber having a small diameter variation can be produced with a high yield. According to the manufacturing method of the present invention, so-called "carbon nanofiber" having a diameter in a range of, for example, 1 to 1,000 nm can be obtained. The relative standard deviation of the diameter of the carbon nanofiber obtained by the manufacturing method of the present invention is 20% or less, preferably 10% or less.

Embodiment

Hereinafter, an embodiment of the present invention will be described in detail with reference to the accompanying drawings. An example of carbon fiber producing method by the LPI technique in which a raw material liquid is introduced pulsedly is illustrated herein, but the scope of the present invention is not limited thereto.

FIG. 1 is a schematic view illustrating a configuration of a carbon fiber manufacturing apparatus according to an embodiment of the present invention. As shown in FIG. 1, carbon fiber manufacturing apparatus 100 according to the embodiment includes raw material liquid introduction port 110, carrier gas introduction port 120, reaction tube 130, filter 140, electric furnace 150, and gas discharge port 160.

Reaction tube 130 is a circular shaped tube reactor for producing carbon fiber and is disposed with its central axis directing vertically. Raw material liquid introduction port 110 and carrier gas introduction port 120 are disposed at the upper opening of reaction tube 130, and gas discharge port 160 is disposed at the lower opening of reaction tube 130. Except its end portions, reaction tube 130 is surrounded by electric furnace 150. By heating reaction tube 130, electric furnace 150 forms high-temperature zone 170 heated to 900 to 1,300° C. Filter 140 that is a porous body for generating a raw material gas from a raw material liquid is disposed between the opening where raw material liquid introduction port 110 and carrier gas introduction port 120 are disposed, and high-temperature zone 170. Filter 140 is also heated by electric furnace 150.

Figure 2A:
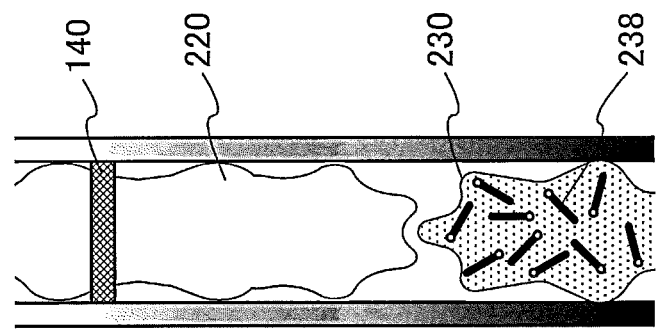
FIGS. 2A to 2C are schematic view for explaining a carbon fiber manufacturing procedure.
Figure 2B:
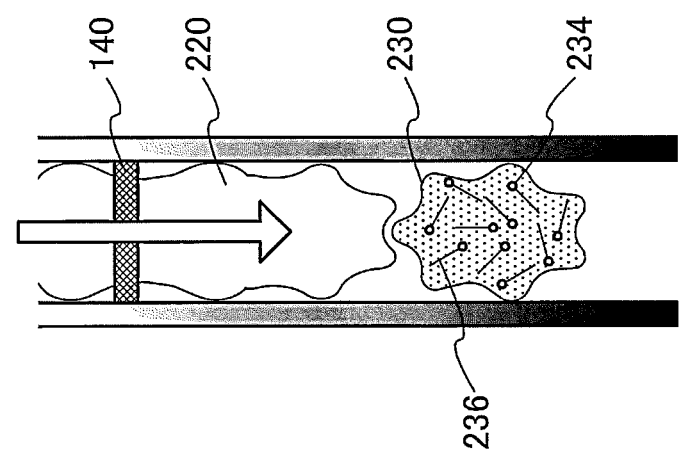
Figure 2C:
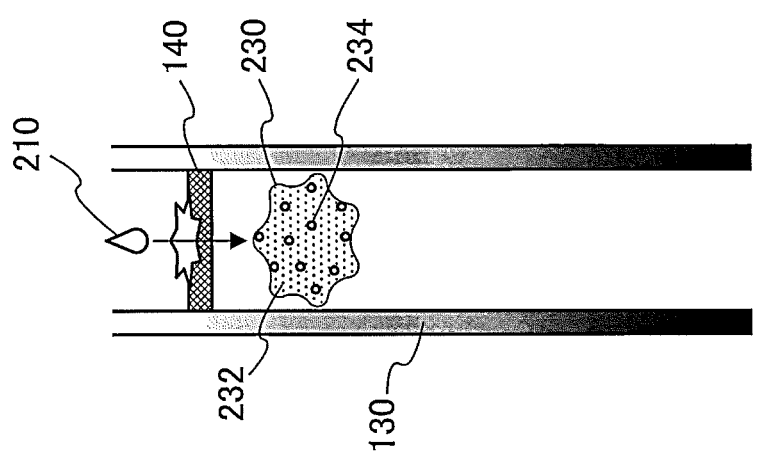

Next, referring to FIGS. 2A to 2C, the carbon fiber manufacturing procedure using carbon fiber manufacturing apparatus 100 will be explained. FIGS. 2A to 2C illustrate a partially enlarged view of carbon fiber manufacturing apparatus 100. In these drawings, electric furnace 150 is not illustrated. The temperatures of reaction tube 130 are indicated in colors (high temperature: black, and low temperature: white).

Before manufacturing of carbon fiber starts, reaction tube 130 is heated to 900 to 1,300° C. Filter 140 will also be heated together.

As shown in FIG. 2A, a droplet of raw material liquid 210 containing a hydrocarbon or an alcohol (carbon compound), and an organometallic compound (catalyst precursor) is dropped from raw material liquid introduction port 110 to reaction tube 130 (pulse introduction). The droplet of raw material liquid 210 falls on heated filter 140 and evaporates and undergoes thermal decomposition on the spot to produce raw material gas 230 containing carbon source 232 and catalyst fine particles 234.

Immediately after introduction of the droplet of raw material liquid 210, carrier gas 220 is introduced pulsedly from carrier gas introduction port 120 into reaction tube 130 as shown in FIG. 2B. As a result, raw material gas 230 is rapidly pushed out to high-temperature zone 170 and heated to 900 to 1,300° C. In the high-temperature environment carbon source 232 and catalyst fine particles 234 contact each other, whereby primary fibers 236 grow in the longitudinal direction from catalyst fine particles 234.

As described above, carrier gas 220 is introduced pulsedly. Therefore, raw material gas 230 reached high-temperature zone 170 is never pushed out toward the bottom of reaction tube 130 (gas discharge port 160) any more. Raw material gas 230 is thereby retained at high-temperature zone 170 for a relatively long period. As a result, as shown in FIG. 2C, primary fibers 236 grown from catalyst fine particles 234 grow in radial direction by thermal CVD, and carbon fibers 238 sufficiently grown in the longitudinal and radial directions are produced.

By repeating the operations shown in FIGS. 2A to 2C sequentially, a large amount of carbon fibers 238 with desired length and width can be produced continuously. After the required amount of carbon fibers is produced, electric furnace 150 is turned off and reaction tube 130 is cooled to room temperature. Then, from the bottom of reaction tube 130, carbon fibers 238 deposited at the bottom of reaction tube 130 are taken out.

As described above, a feature of the carbon fiber manufacturing method of the present invention is to introduce a carrier gas pulsedly into a reactor after a raw material liquid has been introduced into the reactor. Consequently, a raw material gas derived from the raw material liquid is rapidly delivered to a high-temperature zone of the reactor and retained in the high-temperature zone for a relatively long period. As a result, growth of primary fibers in the longitudinal and radial directions is allowed to proceed efficiently and sufficiently, and carbon fiber sufficiently grown in the longitudinal and radial directions can be produced efficiently.

EXAMPLES

Hereinafter, the present invention will be described in detail with reference to Examples, which however shall not be construed as limiting the scope of the present invention.

1. Manufacturing of Carbon Fiber

Using carbon fiber manufacturing apparatus 100 shown in FIG. 1, carbon fiber was produced through the procedure described below. A ceramic tube with a length of 100 cm and an inner diameter of 4.2 cm (available from Nikkato Co., LTD) was used as reaction tube 130. In Examples 1 to 3, a carrier gas was introduced pulsedly into reaction tube 130 during carbon fiber manufacturing. In Comparative Examples 1 to 3, a carrier gas was introduced continuously into reaction tube 130 during carbon fiber manufacturing.

Example 1

Setting reaction tube 130 at room temperature, nitrogen gas was flowed into reaction tube 130 from carrier gas introduction port 120 to replace air in reaction tube 130 with the nitrogen gas. Hydrogen gas was then flowed into reaction tube 130 from carrier gas introduction port 120, and the nitrogen gas in reaction tube 130 was replaced with the hydrogen gas. Thereafter, with the hydrogen gas remained inside of reaction tube 130, reaction tube 130 was heated to 1,200° C. using electric furnace 150 and retained at that temperature.

A raw material liquid containing a carbon compound and a catalyst precursor (carbon compound: 94 wt % benzene, catalyst precursor: 5 wt % ferrocene, catalytic promoter: 1 wt % thiophene) was prepared. The raw material liquid (20 μL) was introduced pulsedly from raw material liquid introduction port 110 into reaction tube 130 by using a microsyringe, and immediately thereafter, 40 mL of hydrogen gas was introduced pulsedly from carrier gas introduction port 120 into reaction tube 130. The series of introductions of the raw material liquid and hydrogen gas was repeated 20 times in total at every 60 seconds.

Finally, nitrogen gas was flowed into reaction tube 130 from carrier gas introduction port to purge reaction tube 130 with the nitrogen gas, and reaction tube 130 was cooled to room temperature. Carbon fibers deposited at the bottom of reaction tube 130 were then taken out from reaction tube 130. The amount of hydrogen gas (carrier gas) used during carbon fiber manufacturing was 800 mL.

Example 2

Carbon fiber was produced in the same procedure as in Example 1 except that the introduction amount of hydrogen gas for per introduction was 60 mL and that the series of introductions of the raw material liquid and hydrogen gas was repeated 20 times in total at every 20 seconds. The amount of hydrogen gas (carrier gas) used during carbon fiber manufacturing was 1,200 mL.

Example 3

Carbon fiber was produced in the same procedure as in Example 1 except that a raw material liquid containing ethanol as a carbon compound (carbon compound: 97 wt % ethanol, catalyst precursor: 2 wt % ferrocene, catalytic promoter: 1 wt % thiophene) was used. The amount of hydrogen gas (carrier gas) used during carbon fiber manufacturing was 800 mL.

Comparative Example 1

Setting reaction tube 130 at room temperature, nitrogen gas was flowed into reaction tube 130 from carrier gas introduction port 120 to replace the air in reaction tube 130 with the nitrogen gas. Hydrogen gas was flowed into reaction tube 130 from carrier gas introduction port 120, and the nitrogen gas in reaction tube 130 was replaced with the hydrogen gas. With hydrogen gas flowing at the flow rate of 100 mL/min, reaction tube 130 was heated to 1,200° C. using electric furnace 150 and retained at that temperature.

A raw material liquid containing a carbon compound and a catalyst precursor (carbon compound: 94 wt % benzene, catalyst precursor: 5 wt % ferrocene, catalytic promoter: 1 wt % thiophene) was prepared. With hydrogen gas flowing at the flow rate of 100 mL/min, the raw material liquid (20 μL) was repeatedly introduced pulsedly by using a microsyringe for 20 times in total at every 60 seconds from raw material liquid introduction port 110 into reaction tube 130.

Finally, nitrogen gas was flowed into reaction tube 130 from carrier gas introduction port to purge reaction tube 130 with the nitrogen gas, and reaction tube 130 was cooled to room temperature. Carbon fibers deposited at the bottom of reaction tube 130 were then taken out from reaction tube 130. The amount of hydrogen gas (carrier gas) used during carbon fiber manufacturing was 2,000 mL.

Comparative Example 2

Carbon fiber was produced in the same procedure as in Comparative Example 1 except the hydrogen gas flow rate was 400 mL/min. The amount of hydrogen gas (carrier gas) used during producing the carbon fiber was 8,000 mL.

Comparative Example 3

Carbon fiber was produced in the same procedure as in Comparative Example 1 except that the hydrogen gas flow rate was 180 mL/min and the introduction of the raw material liquid was repeated for 20 times in total at every 20 seconds. The amount of hydrogen gas (carrier gas) used during carbon fiber manufacturing was 1,200 mL.

2. Evaluation of Manufacturing Methods

For each of the manufacturing methods of Examples 1 to 3 and Comparative Examples 1 to 3, carbon yield was calculated and the diameters of the produced carbon fibers were measured. Also, a relative standard deviation of the diameter of the carbon fiber was calculated for each manufacturing method.

(1) Calculation of Carbon Yield

For each of the manufacturing methods of Examples 1 to 3 and Comparative Examples 1 to 3, carbon yield was calculated using the following formula (1):

[Formula for Calculation of Carbon Yield]

$$\text{Carbon yield} = (\text{Mass of carbon fiber})/(\text{Mass of carbon contained in raw material liquid}) \times 100 \qquad (1)$$

Figure 3A:
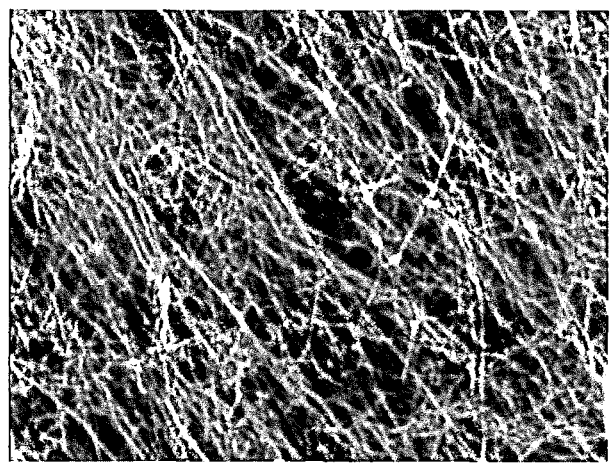
FIGS. 3A to 3C are electron microscopy images of carbon fibers produced by manufacturing methods according to Examples 1 to 3.
Figure 3B:
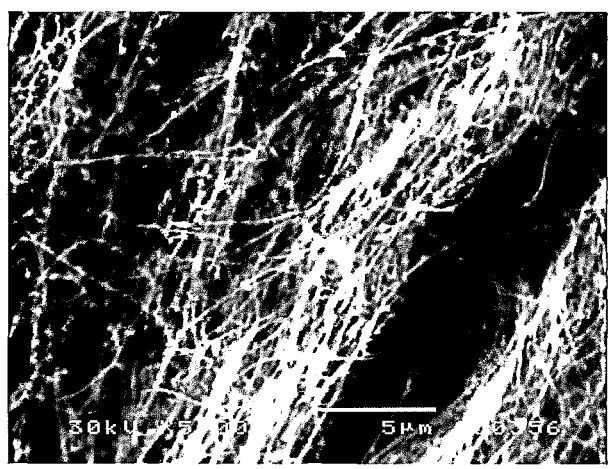
Figure 3C:
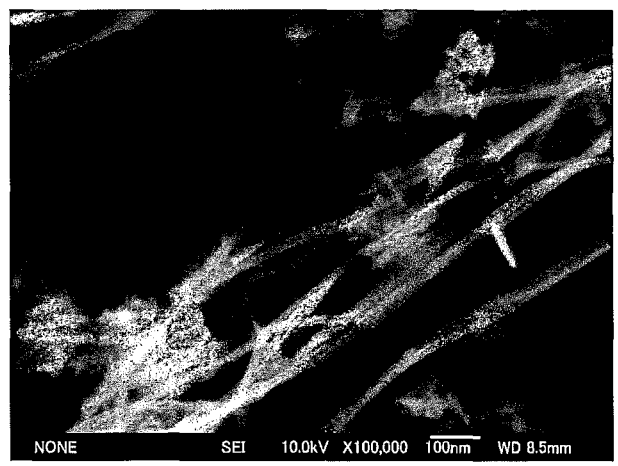
Figure 4A:
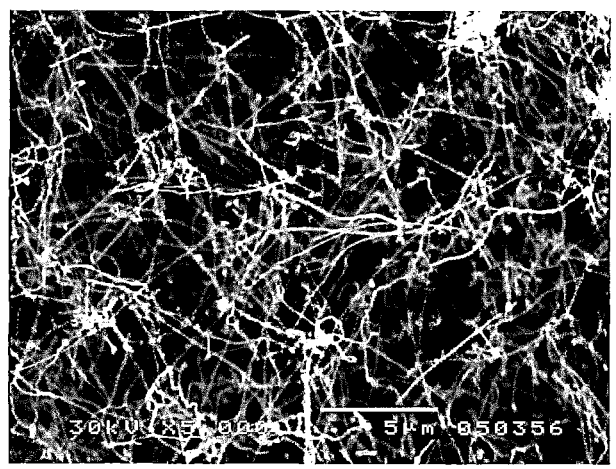
FIGS. 4A to 4C are electron microscopy images of carbon fibers produced by manufacturing methods according to Comparative Examples 1 to 3.
Figure 4B:
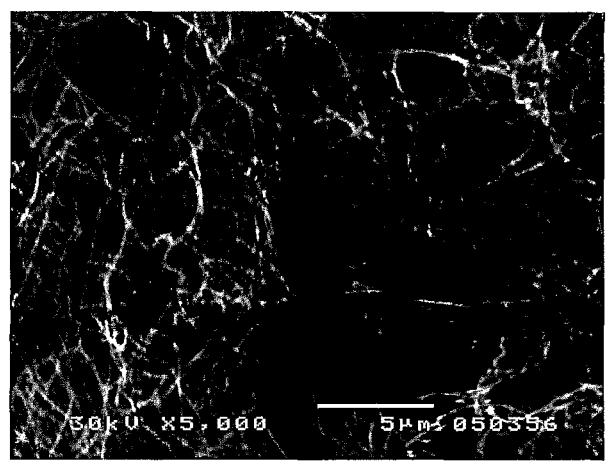
Figure 4C:
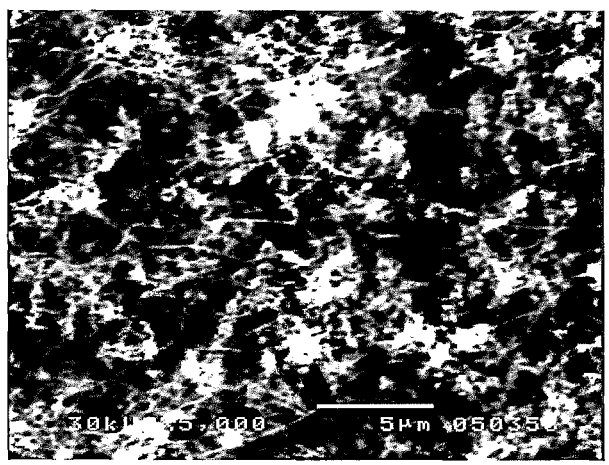

(2) Measurement of Fiber Diameter and Calculation of Relative Standard Deviation The carbon fibers produced by the manufacturing methods of Examples 1 to 3 and Comparative Examples 1 to 3 were observed with a scanning electron microscope (JSM-5410; available from JEOL Ltd.) and a field emission scanning electron microscope (JSM-6500F; available from JEOL Ltd.). FIG. 3A is an electron microscopy image of carbon fibers produced by the manufacturing method of Example 1, FIG. 3B is an electron microscopy image of carbon fibers produced by the manufacturing method of Example 2, and FIG. 3C is an electron microscopy image of carbon fibers produced by the manufacturing method of Example 3. FIG. 4A is an electron microscopy image of carbon fibers produced by the manufacturing method of Comparative Example 1, FIG. 4B is an electron microscopy image of carbon fibers produced by the manufacturing method of Comparative Example 2, and FIG. 4C is an electron microscopy image of carbon fibers produced by the manufacturing method of Comparative Example 3.

For each manufacturing method, 30 carbon fibers were randomly selected from the obtained electron microscopy image, and the diameter was measured for each fiber. Subsequently, for each manufacturing method, an arithmetic mean value and a standard deviation of the diameter of the carbon fibers were calculated, and then a relative standard deviation was calculated by dividing the standard deviation by the arithmetic mean value.

(3) Results

Carbon yield, fiber diameter, relative standard deviation of the diameter, carrier gas usage, raw material introduction intervals, and by-product amount of each manufacturing method are shown in Table 1.

TABLE 1

|  | Carbon yield (%) | Fiber diameter (nm) | Relative standard deviation of fiber diameter(%) | Usage of carrier gas (mL) | Introduction intervals (sec) | Amount of by-product |
|---|---|---|---|---|---|---|
| Example 1 | 65 | 65.6 ± 2.5 | 3.8 | 800 | 60 | Small |
| Example 2 | 65 | 96.9 ± 5.4 | 5.6 | 1200 | 20 | Small |
| Example 3 | 9.6 | 16.4 ± 1.6 | 9.7 | 800 | 60 | Small |
| Comparative Example 1 | 65 | 118.3 ± 26.4 | 23 | 2000 | 60 | Large |
| Comparative Example 2 | 30 | 65.7 ± 14.7 | 23 | 8000 | 60 | Small |
| Comparative Example 3 | 60 | 106.2 ± 22.9 | 22 | 1200 | 20 | Very large |

As shown in Table 1, in Comparative Example 1, it required long time for the raw material gas to reach the high-temperature zone and therefore the onset of growth of primary fibers start varied, resulting in large variation in the carbon fiber diameter. In Comparative Example 2, the raw material gas passed through the high-temperature zone in a short time, resulting in large variation in carbon fiber diameter variation and low carbon yield. In Comparative Example 3, raw materials derived from different pulses interfere each other before the raw materials reach the high-temperature zone, resulting in large variation in carbon fiber diameter and generation of significantly large amounts of non-fibrous by-product (see, FIG. 4C).

In contrast, in Examples 1 to 3, it required only short time for the raw material gas to reach the high-temperature zone and the retention time of the raw material gas in the high-temperature zone was long, resulting in small variation in the carbon fiber diameter and high carbon yield. Further, the amount of by-product was small. Although the carbon yield was 9.6% in Example 3, it can be said that the carbon yield was high for the fact that ethanol was used as the carbon compound.

This application is entitled to and claims the benefit of Japanese Patent Application No. 2012-051855, filed on Mar. 8, 2012, the disclosure of which including the specification, drawings and abstract is incorporated herein by reference in its entirety.

INDUSTRIAL APPLICABILITY

The manufacturing method of carbon fiber of the present invention is useful as a manufacturing method of a high-quality carbon fiber, because a long carbon fiber having a small fiber diameter variation can be continuously produced. Carbon fiber produced by the manufacturing method of the present invention can be used in many applications including plastic reinforcing materials, gas storage materials, and electrode materials.

REFERENCE SIGNS LIST 100 carbon fiber manufacturing apparatus
110 raw material liquid introduction port
120 carrier gas introduction port
130 reaction tube
140 filter
150 electric furnace
160 gas discharge port
210 raw material liquid
220 carrier gas
230 raw material gas
232 carbon source
234 catalyst fine particle
236 primary fiber
238 carbon fiber

The invention claimed is:

1. A method of manufacturing carbon fiber comprising:
preparing a raw material liquid containing a carbon compound and a catalyst or catalyst precursor;
providing a reactor having a high-temperature zone heated to a temperature at which carbon fiber can be grown;
producing a mixture consisting of a gas containing a carbon source and of catalyst fine particles dispersed in the gas, by introducing the raw material liquid into the reactor; and
pushing out the mixture to the high-temperature zone by introducing a carrier gas pulsedly into the reactor, wherein an introduction time per pulse of the carrier gas is in a range of 0.005 to 2.0 seconds.

2. The method according to claim 1, further comprising:
after pushing out the mixture to the high-temperature zone by introducing the carrier gas pulsedly into the reactor, growing in the high-temperature zone primary fibers by contacting the carbon source with the catalyst fine particles contained in the mixture, and subsequently growing carbon fibers under an environment where the carrier gas is retained.

3. The method according to claim 1, wherein the mixture and the carrier gas are introduced into a region of the reactor other than the high-temperature zone.

4. The method according to claim 1, wherein the mixture is produced by evaporation or thermal decomposition of the raw material liquid introduced into the reactor.

5. The method according to claim 1, wherein a temperature of the high-temperature zone is in a range of 900 to 1,300° C.

* * * * *